United States Patent Office 3,635,922
Patented Jan. 18, 1972

3,635,922
PROCESS FOR POLYMERIZING CONJUGATED DIENES
Tai Chun Cheng, Akron, and Adel F. Halasa, Bath, Ohio, assignors to The Firestone Tire & Rubber Company, Akron, Ohio
No Drawing. Filed Oct. 27, 1969, Ser. No. 869,879
Int. Cl. C08d 1/32; C08f 1/28
U.S. Cl. 260—83.7 R      23 Claims

ABSTRACT OF THE DISCLOSURE

Conjugated dienes are polymerized by a new catalyst system which is more economically and more easily prepared and used than present catalyst systems used for similar purpose. This catalyst system comprises a combination of a free radical anion component modified by an alkali metal halide. The free radical anionic component is made, in an appropriate solvent, from an alkali metal and an anion forming compound such as naphthalene. The alkali metal halide is preferably potassium chloride, bromide or iodide, but can also be other alkali metal halides. The catalyst system is used to polymerize conjugated dienes to polymer products of controlled molecular weight, suitable for easy processing and having properties desirable for ultimate use in tires and other molded products. The molecular weights of the products are increased by virtue of the modifier as compared to the molecular weights obtained with the radical anion component alone.

BACKGROUND OF THE INVENTION

Field of the invention

This invention relates to a process for the polymerization of dienes using a catalyst composition comprising an alkali metal free radical anionic compound associated with an alkali metal halide such as potassium chloride, bromide or iodide together with an ether or other appropriate solvent.

Related prior art

The polymerization of conjugated dienes can be effected in a variety of methods. However, there are disadvantages in the various methods presently known including undesirable or uncontrollable properties in the products, such as lack of control of molecular weight, molecular weight distribution and processability of the polymers. Moreover, many of the catalysts are pyrophoric and therefore dangerous to use, and are expensive to prepare.

For example, the so-called "Alfin" catalyst system which has been studied extensively produces polybutadienes of approximately 5,000,000 molecular weight, or even higher, which are difficult to process for commercial use. This catalyst system generally comprises allyl sodium, sodium isopropoxide and sodium chloride. There are a number of literature references describing the Alfin process, typical of which is the review article in Rubber Age, vol. 94, October 1963, pp. 87–92. The Alfin catalyst system effects very rapid formation of a very high molecular weight polymer having molecular weights of about 5,000,000 with about 75% of the polymer in the trans-1,4 configuration.

Polymerization by an alkyl sodium, such as amyl sodium, produces a much slower polymerization reaction to give a polymer having as high as 70% in the 1,2- configuration with a molecular weight too low for desirable properties. Polybutadienes prepared by the use of n-butyl lithium in n-hexane have about 8–10% 1,2-; 53–54% trans-1,4; and 35–37% cis-1,4 configurations, which polymers do not have sufficient 1,2- configuration for the desired properties. By using polar modifiers or solvents, such as ethers, amines, etc., the vinyl content can be increased to up to 50–70%.

However, the molecular weight distribution in such cases is so narrow as to give poor processability. Moreover, the polar modifiers act as chain terminators and prevent active polymer products that might be coupled or otherwise post-treated to improve the processability. Processability is very important for commercial rubber production. Among other disadvantages, poor processability results in poor adhesion to fillers and thereby gives poor reinforcement.

High glass transition temperatures in butadiene polymers generally indicate and accompany good wet traction. Butadiene emulsion polymers have low glass transition temperatures and have poor wet traction when fabricated into tires.

Alkali metal anionic catalysts, such as sodium naphthalenide, give low molecular weight polymers with poor processability.

In addition to the above disadvantages, most of the catalysts referred to above require very low temperatures, generally below $-5°$ C. for preparation, and are more expensive to prepare since they require the reaction of an alkali metal, such as sodium, with a halogenated hydrocarbon, such as amyl chloride, butyl chloride, and the like, which results in the reaction of two atoms of sodium to prepare one mole of sodium alkyl, sodium allyl, etc.

British Pat. 964,259 discloses the use of a sodium-naphthalene anion system used for the polymerization of styrene, butadiene and other monomers with the terminal anions of the product treated with chemical reagents to form terminal OH or COOH groups. The polymer products are low molecular weight and in most cases are liquid.

British Pat. 910,227 discloses the polymerization of dienes, preferably isoprene, to polymers resembling Hevea rubber and having 85% or more, usually 93% or more, in the cis-1,4- addition structure. The catayst system used is a lithium arylide of a polynuclear fused ring or contiguous ring aromatic hydrocarbon plus titanium trichloride. The solvents used in the polymerization are non-polar, non-acidic organic solvents such as paraffins and cycloparaffins, including propane, pentane, cyclohexane, and the like. The resulting high cis-1,4- structure and consequently low 1,2- structure is not desirable from the standpoint of wet traction in tires molded from this product. For good wet traction it is desirable to have much higher proportions of 1,2- structure than obtained in the polymers made by the patentee's process.

SUMMARY OF THE INVENTION

In accordance with the present invention, it has now been found that conjugated diene polymers of controllable molecular weight, broad molecular weight distribution, good processability, high glass transition temperatures, and good wet traction are produced by the use of the catalyst system of this invention, which is less expensively and more easily and safely prepared than the catalyst systems mentioned above, and can be prepared and used at more convenient temperatures.

This catalyst system comprises a free radical alkali metal anionic derivative of an anion forming compound, such as naphthalene, diphenyl, anthracene, and the like, modified with an alkali metal halide, preferably potassium chloride, bromide or iodide. Advantageously the catalyst system is prepared and used in an appropriate solvent such as tetrahydrofuran, diglyme (the dimethyl ether of ethylene glycol), dimethyl ether, 1,2-dimethoxyethane, dioxane, methyl tetrahydrofuran, tetrahydropyran, acetonitrile, and the like including those listed in "Radical Ions" by Kaiser and Kevan, Chapters 2, 3 and 6, published by John Wiley & Sons, Inc., New York (1968).

Alkali metal halides that can be used as modifiers include the potassium, sodium, lithium and cesium chlorides, bromides, iodides and fluorides.

The anion components useful in the present invention may be broadly described as radical anion complexes of an alkali metal with an anion-forming compound such as contiguous-ring aromatic hydrocarbons, tetramethylene ethane and ketyls. Useful cyclic hydrocarbons include those having at least 10 carbon atoms, such as naphthalene, diphenyl, terphenyl, anthracene, phenanthrene, dihydrophenanthrene, triptycene, benzanthracene, naphthacene, chrysene, pyrene, perylene, coronene, dibenzanthracene, benzopyrene cholanthrene, fluorene, tetramethylene ethane, and the like including those listed in "Radical Ions" by Kaiser and Kevan, chapters 2, 3 and 6, published by John Wiley & Sons, Inc., New York (1968). Benzene, toluene, and the xylenes are not embodied in the groups of catalysts useful in the present invention. Most preferred is naphthalene. A less preferred group of compounds useful in forming catalysts with alkali metals are the ketyls, such as from benzophenone and xanthone.

The alkali metals useful in the complexes include lithium, sodium, potassium, rubidium and cesium. The preferred alkali metals are potassium, lithium and sodium.

The catalysts of this invention are prepared most conveniently by reacting substantially molar equivalents of the alkli metal and an anion forming compound of the aforementioned type preferably in an inert solvent for the complex and preferably a slight excess of the compound. While excess of either reagent may be present, the amount of anion formed will correspond to the stoichiometric amount for the reagent present in lower molecular amount.

The catalyst can be prepared at about room temperature and is advantageously aged overnight at about 5° C. If not to be aged, the catalyst is advantageously prepared at 5° C. In any case the temperature during preparation is advantageously no higher than about 30° C. Higher temperatures, particularly 60° C. or higher, produce side reactions which compete with the formation of the desired radical anions.

The ratio of catalyst components can be in the range of 0.5 to 4 moles of alkali metal halide per mole of alkali metal anion, and preferably 1-3 moles per mole of anion.

The ratio of catalyst to monomer can be in the range of 0.1-1 millimole per 100 grams of monomer, preferably 0.2-0.5 millimole per 100 grams of monomer. This may be varied even more if low molecular weights can be tolerated. Moreover, the optimum amount may vary according to the polymerization temperature.

The solution concentrations are not critical but for obvious practical purposes it is preferable not to use too much solvent. The catalyst solution concentration is advantageously about 0.75 mole per liter.

The preferred solvents for the catalyst and the polymerization reaction medium are aliphatic and alicyclic ethers and the most preferred solvents are tetrahydrofuran, diglyme, dimethyl ether and the like as listed above. In addition to the ether solvent there may also be present inert hydrocarbon diluents such as butane, hexane, heptene, benzene and toluene in the preparation of the polymers of this invention.

The polymerization reaction is conducted preferably in a closed reaction vessel and all operations are carried out in an inert atmosphere such as nitrogen. The reaction mixture is stirred rapidly during the course of the reaction and the catalyst is added to the monomer solution in the preferred procedure.

For best results the polymerization should be carried out at temperatures of from 5° C. to 100° C. and preferably from 30° C. to 50° C. With temperatures above 100° C. the molecular weight of the product decreases with increase in temperature, but where this can be tolerated temperatures as high as 200° C. can be used.

To prepare the radical anion the alkali metal is mixed or ground with the anion-forming compound, such as a contiguous-ring aromatic hydrocarbon. The alkali metal and the hydrocarbon combine stoichiometrically, usually in the ratio of one or two atoms of metal per mole of hydrocarbon, without the evolution of hydrogen or any other by-products. The product is salt-like in character. Apparently an electron from the metal enters a cyclic pi orbital of the hydrocarbon, yielding a negatively charged hydrocarbon ion and a positively charged metal ion. As distinguished from the more familiar metal aryls, in which the metal such as sodium or lithium replaces a hydrogen atom of the aromatic hydrocarbon and is covalently bonded to a carbon atom of the hydrocarbon, the metal arylides exhibit salt-like conductivity in the solid state, are relatively insoluble in hydrocarbon solvents, and react with mercury to form an amalgam and to regenerate the hydrocarbon. Hydrocarbons from which the arylides can be formed include the fused-ring aromatic hydrocarbons or the contiguous-ring aromatic hydrocarbons, meaning by "contiguous-ring aromatic hydrocarbons" those in which a carbon of one ring is covalently bound to a carbon of another ring. Examples of such aromatic hydrocarbons include, for instance, naphthalene, anthracene, chrysene, biphenyl, fluorene, triphenylene, naphthacene, phenanthrene and the like. The general class of arylide compounds is discussed in an article by Paul et al. JACS 78, 116 (1956). For the most part, one gram-atom of metal combines with one mole of the hydrocarbon. However, in the case of biphenyl or triphenylene, two atoms of the metal may combine with each mole of hydrocarbon.

Diolefins suitable for use in this invention include butadiene, isoprene, 2-methyl-1,3-pentadiene, 2,3-dimethylbutadiene, cyclopentadiene, and the like. It will be understood that mixtures of diolefins may also be used.

The diolefins employed in this invention should be of a high degree of purity for use in the practice of this invention. It is desirable that the diolefin should be of at least 90 mole percent purity and preferably in the neighborhood of 95 or more mole percent purity. In general, the purer the diolefin, the faster the reaction rate. Acetylenic compounds, or other compounds containing reactive hydrogen which tend to reduce the effective catalyst concentration or to act as chain terminators should be kept at a minimum or removed prior to use, since they use up catalyst and also tend to lower the molecular weight of the resulting polymer. Any inhibitor normally present in a commercial diolefin must be removed by conventional techniques prior to polymerization in accordance with the invention.

For small scale laboratory preparations, the polymerization reactions may be conveniently carried out in glass bottles sealed by crown caps. These crown caps have several openings covered by an inner lining of rubber. Before use, the bottles should be dried, for instance by flaming with helium, argon, or other inert gas.

An atmosphere of inert gas such as helium, argon or the like is preferably maintained in the bottle during the charging to avoid contact of oxygen with the monomer, and it will usually be desirable to complete the purging of oxygen from the system by allowing a portion of the butadiene to evaporate with the bottle loosely capped, after which the crown cap is sealed. Then the composite catalyst, which will usually be in the form of a readily flowable solution of the catalyst, is introduced by means of a hypodermic syringe, the needle of which is inserted in one of the openings in the crown seal and pushed through the rubber liner. A hypodermic syringe is a convenient instrument for handling the catalyst, since it will keep the catalyst out of contact with the atmosphere. The sealed bottle may either be placed on a polymerizer wheel, arranged to dip and revolve the bottle in a water bath at the desired polymerization temperature, or after brief shaking or other agitation to mix the catalyst with the other ingredients, the bottle may be allowed to stand quiescent in a medium maintained at the desired polymerization temperature.

The polymerization will usually be complete in from 3 to 60 hours, depending on the temperature, catalyst concentration and other pertinent conditions. It is usually necessary to cut open the bottle to remove the polymer. Since the polymer contains no antioxidants, it is extremely susceptible to oxidation. A preferred method of shielding the polymer from oxidation consists in dropping it into a methanol, isopropanol or other alcoholic solution of an antioxidant and agitating the mixture. The alcohol serves as a vehicle for distributing the antioxidant, as an agent to destroy the catalyst, and causes the polymer to separate out from the solvent used in the polymerization mass. The separated polymer is then preferably washed with water on a roll mill, usually with addition of further stabilizing agents, and dried.

Corresponding techniques should be used in large scale polymerizations. Usually the reaction will be carried out in a closed autoclave provided with a heat-transfer jacket and with a rotary agitator. Avoidance of oxygen contamination is most easily secured by evacuating the vessel prior to charging the monomer and solvent and evaporating and venting a portion of the charge to sweep out any traces of oxygen present. As a precaution for the purity of the monomer and solvent, a silica gel or other suitable adsorption column is preferably inserted in the charging line for these materials. The catalyst is preferably charged last, conveniently from an auxiliary charging vessel pressured with an inert gas and communicating with the polymerization vessel through a valved conduit. It is desirable to provide a reflux condenser to assist in the regulation of the reaction temperature which will usually be maintained between 0° C. and 150° C., preferably between 30° and 80° C. Upon completion of the polymerization, the polymerization mass is removed, immersed under the surface of a body of methanol, isopropanol or other alcohol containing an antioxidant, and agitated therewith to precipitate the polymer, destroy the catalyst and incorporate the antioxidant. The precipitated mass may be milled with water on a wash mill to remove the alcohol, additional antioxidant being incorporated during this operation. The product is then dried for storage and use.

Although butadiene homopolymers are preferred in the practice of this invention, other conjugated diene homopolymers and copolymers of the dienes can be used also where the comonomers impart desirable properties and do not detract from the polymer properties. The comonomers are preferably olefins, such as butene-1, n-butene-2, isobutylene, n-pentene-1, n-pentene-2, and the like, as well as other dienes, as listed above, and also including vinyl aryl or isopropenyl aryl compounds or derivatives thereof having alkyl, aralkyl, cycloalkyl or chlorine attached to the aromatic nucleus, and preferably having no more than 20 carbon atoms. Typical of these aromatic comonomers are styrene, alphamethyl styrene, vinyl toluene, isopropenyl toluene, ethyl styrene, p-cyclohexyl styrene, o-, m- and p-Cl-styrene, vinyl naphthalene, vinyl methyl naphthalene, vinyl butyl naphthalene, vinyl cyclohexyl naphthalene, isopropenyl naphthalene, isopropyl isopropyl naphthalene, 1-vinyl-4-chloronaphthalene, 1-isopropenyl-5-chloronaphthalene, vinyl diphenyl, vinyl diphenylethane, 4-vinyl-4'-methyl-diphenyl, 4-vinyl-4'-chlorodiphenyl, and the like. Preferably such comonomers have no more than 12 carbon atoms. Where such comonomers are to be used, generally at least 1%, preferably at least 5% by weight should be used and as much as 60%, preferably no more than 30% may be used.

In referring herein to millimoles of catalyst this corresponds to the millimoles of anion complex since the catalyst is regarded or at least calculated as a complex of the metal halide and the anion complex.

The polymerization is advantageously effected in the presence of an inert diluent to facilitate handling of the polymer and to give better temperature control. Normally liquid hydrocarbons are preferred for this purpose, such as benzene, toluene, saturated aliphatic hydrocarbons preferably of the straight chain variety, such as n-hexane, n-heptane, etc. However, where provision is made for external heat dissipation and temperature control, the solvent can be omitted.

The "dilute solution viscosity" referred to herein is defined as the inherent viscosity determined at 25° C. on a 0.4% solution of the polymer in toluene. It is calculated by dividing the natural logarithm of the relative viscosity by the percent concentration of the solution, i.e., it is the inherent viscosity measured at 0.4% concentration.

Polybutadienes having dilute solution viscosities in the range of 1–4, preferably 2–2.5 are found suitable to give the desired properties for tire production and other molding purposes. Translated to molecular weights, DSV's correspond to polybutadiene molecular weights as follows: DSV of 1 means a mol. wt. of 60,000; DSV of 1.5 equals 100,000 mol. wt.; DSV of 2.6 equals 200,000 mol. wt.; DSV of 3.0 equals 240,000 mol. wt.; and DSV of 4.0 equals 320,000. Corresponding molecular weights of the other homopolymers and copolymers made according to this invention are also preferred for desired properties.

Various methods of practicing the invention are illustrated by the following examples. These examples are intended merely to illustrate the invention and not in any sense to limit the manner in which the invention can be practiced. The parts and percentages recited therein and all through the specification, unless specifically provided otherwise, are by weight.

EXAMPLE I

An anionic sodium naphthalenide-potassium chloride catalyst is prepared as follows: Naphthalene (21.5 g., 0.165 mole) is dissolved under a dry nitrogen atmosphere in 200 ml. of purified tetrahydrofuran and 3.45 g. (0.15 mole) of sodium is then added to it. After stirring 20 hrs. at 5° C., 22.4 g. (0.30 mole) of potassium chloride is added, after which stirring is continued for 3 hrs. at 5° C. Then the resultant mixture is stored at −10° C. until time for use.

EXAMPLE II

Polymerization of butadiene is effected in a pressure reactor equipped with stirrer and heat-transfer jacket. A solution of 2410 g. containing 590 gms. of butadiene in hexane is charged into the reactor, which has previously been flushed with dry nitrogen. The monomer is then stirred for about 10 min. at 34° C. and 9 ml. (6.25 mmole) of the catalyst prepared in Example I is then added by means of a hypodermic syringe at 25 lbs. of nitrogen pressure at 80° F. (27° C.). The system is immediately closed. After 6–8 hrs. stirring at 27° C., a polymer is obtained which is collected by pouring the mixture into a large amount of methanol containing 20 ml. of antioxidant agent. After drying, the polymer weighs 595 gms., which represents about 99% yield.

EXAMPLE III

An anionic sodium phenanthracene-potassium chloride catalyst is prepared as follows: Phenanthracene (29.4 g., 0.165 mole) is dissolved in 200 ml. of tetrahydrofuran and 3.45 g. (0.15 mole) of sodium is then added to it. After stirring for 20 hours at 5° C., 11.2 g. (0.15 mole) of potassium chloride is added, after which stirring is continued at 5° C. for 3 hours. At the end of this time, the reaction mixture is stored at −10° C. until time for use.

EXAMPLE IV

Polymerization of butadiene is effected as follows: A solution of 260 g. containing 64 g. of butadiene in hexane is charged to a 28-oz., moisture-free beverage bottle, which has been flushed with dry nitrogen. 1.5 ml. (1.12 mmole) of the catalyst prepared in Example III is then added with a hypodermic syringe at 25 lbs. of nitrogen pressure. The bottle is immediately immersed into a 30°

C. constant temperature bath. After 6–8 hours stirring, the polymer is collected by pouring the mixture into a large amount of methanol containing 2 ml. of antioxidant agent. After drying, the polymer weight represents a 98% theoretical yield.

EXAMPLE V

An anionic lithium naphthalenide-potassium chloride catalyst is prepared as follows: Naphthalene (21.5 g., 0.165 mole) is dissolved in 200 ml. of purified tetrahydrofuran and 1.05 g. (0.15 mole) of lithium is then added to it. After stirring for 20 hrs. at 5° C., 11.2 g. (0.15 mole) of potassium chloride is added, after which stirring is continued at 5° C. for three hours. At the end of this time, the reaction mixture is stored at −10° C. until time for use.

EXAMPLE VI

Polymerization of butadiene is effected with the catalyst of Example V as follows: A solution of 260 g. containing 64 g. of butadiene in hexane is charged into a 28-oz., moisture-free beverage bottle, which has been flushed with dry nitrogen. 1.5 ml. (1.12 mole) of catalyst is then added with a hypodermic syringe at 25 lbs. of nitrogen pressure. The bottle is immediately immersed into a 30° C. constant temperature bath. After 6–8 hours stirring, the polymer is collected by pouring the mixture into a large amount of methanol containing 2 ml. of antioxidant agent. After drying, the polymer weight represents about 98% theoretical yield.

EXAMPLE VII

A number of catalysts are prepared by the procedure of Example I using KCl, KBr and KI respectively and are used in polymerizations according to the procedure of Example IV with variations in the proportion of catalyst as shown below in Table I. The results are also given in Table I with no gel being formed and the 1,2-microstructure of the polymers being in the range of 63.2–68.8%. When tested in tire compositions, these polymers give excellent wet traction properties. Table II gives Williams Plasticity values.

TABLE I

| Modifier | Mmole cat./100 g. BD | DSV | ML/4/ 100° C. | Rec. value | $T_g$ ° C. | I.R. Cis-1,4 | I.R. Trans-1,4 | I.R. 1,2- |
|---|---|---|---|---|---|---|---|---|
| KCl | 1.25 | 1.56 | 32.0 | 1.04 | −46 | 8.5 | 22.7 | 68.8 |
| KCl | 0.75 | 2.22 | 62.1 | 1.85 |  | 10.4 | 26.4 | 63.2 |
| KCl | 1.0 | 1.84 | 40.0 | 1.03 |  | 11.4 | 24.4 | 64.2 |
| KBr | 1.25 | 1.75 | 35.5 | 1.12 | −45 | 10.1 | 22.6 | 67.2 |
| KBr | 1.0 | 2.02 | 50.0 | 1.77 |  | 11.0 | 24.8 | 64.2 |
| KI | 1.25 | 1.74 | 45.5 | 1.54 |  | 7.8 | 23.7 | 68.5 |
| KI | 1.0 | 2.05 | 51.5 | 1.65 |  | 10.2 | 25.2 | 64.6 |

TABLE II

| Modifier | Mmole cat./100 g. BD | Williams Plasticity @ 73° F. (22.8° C.) 3 min. reading, mm. | Williams Plasticity @ 73° F. (22.8° C.) 1 min. reading, mm. |
|---|---|---|---|
| KCl | 1.25 | 5.04 | 1.04 |
| KCl | 0.75 | 6.25 | 1.85 |
| KCl | 1.0 | 5.09 | 1.03 |
| KBr | 1.25 | 5.16 | 1.12 |
| KBr | 1.0 | 5.92 | 1.77 |
| KI | 1.25 | 5.48 | 1.54 |
| KI | 1.0 | 6.07 | 1.65 |

EXAMPLE VIII

The polymerization procedures of Examples I–VI are repeated a number of times with similar results using individually in place of the potassium chloride equivalent weights respectively of:

(a) Potassium bromide
(b) Potassium iodide
(c) Sodium chloride
(d) Sodium bromide
(e) Sodium fluoride
(f) Lithium fluoride
(g) Lithium bromide
(h) Lithium iodide
(i) Cesium chloride
(j) Rubidium bromide

EXAMPLE IX

The procedures of Examples I and II are repeated a number of times with similar results using equivalent amounts respectively of the following hydrocarbons in place of the naphthalene:

(a) Diphenyl
(b) Dihydrophenanthrene
(c) Pyrene
(d) Benzpyrene
(e) Fluorene
(f) Tetramethylene ethane

EXAMPLE X

The procedures of Examples I and II are repeated a number of times with similar results using in place of the sodium equivalent amounts respectively of lithium, potassium, cesium and rubidium respectively.

EXAMPLE XI

The procedures of Examples II, IV and VI are repeated a number of times with similar results using in place of the butadiene equivalent amounts respectively of isoprene, piperylene, 2-methyl-1,3-pentadiene and cyclopentadiene.

EXAMPLE XII

The procedures of Examples I and II are repeated a number of times with similar results using in place of the tetrahydrofuran equal amounts respectively of dimethyl ether of ethylene glycol (diglyme), dimethyl ether of diethylene glycol (glyme-3), dimethyl ether of triethylene glycol (glyme-4), dioxane, methyltetrahydrofuran, tetrahydropyran, dimethyl ether and acetonitrile.

EXAMPLE XIII

The procedure of Example II is repeated a number of times with similar results using in place of the hexane an equal amount respectively of heptane, benzene, toluene and cyclohexane.

EXAMPLE XIV

The procedures of Examples I and II are repeated with satisfactory results using in place of the naphthalene equivalent amounts respectively of benzophenone and Xanthone.

EXAMPLE XV

Comparative tests are made on a number of polybutadienes prepared according to Example VII containing 63.2–68.8% 1,2- microstructure and controls of butyl lithium-catalyzed polybutadiene and styrene-butadiene rubbers of types being used commercially for tire production. The polymers produced according to this invention show excellent resistance to cold flow. Moreover, the overall processability characteristics of these new polymers are better than the corresponding characteristics of the compared commercial types. When the respective polymers are blended respectively in a standard oil recipe and tested with laboratory traction devices, the new polymers of this invention when used 100% register wet traction having about 30% improvement over the controls. When used in 40% mixtures with the controls the composition shows 10–14% improvement over the controls.

The recipe used for the testing composition is: 100 (parts) polymer; 70 ISAF black; 43 oil; 2.5 ZnO; 2.0 stearic acid; 1.0 Santoflex 13; 1.7 sulfur; 1.4 cyclex B accelerator. This is cured for 30 minutes at 300° F. (149° C.).

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims:

The invention claimed is:
1. A process of polymerizing at a temperature of 5–100° C. a polymerizable monomer composition, in which the monomer portion comprises at least 70 percent by weight of a conjugated diene, which comprises polymerizing said composition in the presence of a catalyst consisting essentially of:
   (a) a free radical anion component prepared by the reaction, in the presence of an inert solvent selected from the class consisting of acetonitrile and aliphatic and alicyclic ethers of substantially equivalent amount of potassium or sodium metal with a compound selected from the class consisting of naphthalene, diphenyl, terphenyl, anthracene, phenanthrene, dihydrophenanthrene, triptycene, benzanthracene, naphthacene, chrysene, pyrene, perylene, coronene, dibenzanthracene, benzoprene, cholanthrene, fluorene, tetramethylene ethane, benzophenone, xanthone, benzophenone ketyl and xanthone ketyl; and
   (b) an alkali metal halide selected from the class of chlorides, bromides and iodides;
said anion component and said alkali metal halide being used in the proportion of 0.5–4 moles of alkali metal halide per mole of anion component, and said catalyst being used in a proportion of 0.1–1 millimole of catalyst per 100 parts by weight of polymerizable monomer.

2. The process of claim 1 in which said diene is butadiene.

3. The process of claim 1 in which said solvent is selected from the class consisting of tetrahydrofuran, dimethyl ether, dimethyl ether of ethylene glycol, dimethyl ether of diethylene glycol, dimethyl ether of triethylene glycol, dioxane tetrahydropyran, methyl tetrahydrofuran and acetonitrile.

4. The process of claim 3 in which said solvent is tetrahydrofuran.

5. The process of claim 1 in which said polymerization temperature is 30–50° C.

6. The process of claim 1 in which said anion component is prepared at a temperature no higher than 30° C.

7. The process of claim 1 in which said catalyst composition has 1–3 moles of alkali metal halide per mole of alkali metal anion component.

8. The process of claim 1 in which said catalyst composition is used in a proportion of 0.2–0.5 gram millimoles per 100 grams of monomer.

9. The process of claim 1 in which said anion component is a sodium compound.

10. The process of claim 1 in which said anion component is sodium naphthalenide.

11. The process of claim 10 in which said alkali metal halide is a potassium halide.

12. The process of claim 11 in which said potassium halide is potassium chloride.

13. The process of claim 11 in which said potassium halide is potassium bromide.

14. The process of claim 1 in which said alkali metal halide is a sodium halide.

15. The process of claim 1 in which said alkali metal halide is sodium chloride.

16. The process of claim 1 in which said alkali metal halide is sodium bromide.

17. The process of claim 1 in which said compound is phenanthrene.

18. The process of claim 1 in which said compound is anthracene.

19. The process of claim 1 in which said compound is tetramethylene ethane.

20. The process of claim 1 in which said monomer portion is substantially all butadiene.

21. The process of claim 1 in which said diene is isoprene.

22. The process of claim 1 in which said diene is 1,3-pentadiene.

23. The process of claim 1 in which said monomer portion also includes styrene.

References Cited

UNITED STATES PATENTS

| 3,265,758 | 8/1966 | Hedman et al. | 260—94.2 T |
| 3,280,094 | 10/1966 | Forman | 260—94.2 T |

FOREIGN PATENTS

| 910,227 | 11/1962 | Great Britain | 260—94.3 |

JAMES A. SEIDLECK, Primary Examiner

U.S. Cl. X.R.

260—82.1, 85.3, 94.2 M; 252—429

UNITED STATES PATENT OFFICE
CERTIFICATE OF CORRECTION

Patent No. 3,635,922          Dated January 18, 1972

Inventor(s) Tai Chun Cheng and Adel F. Halasa

It is certified that error appears in the above-identified patent and that said Letters Patent are hereby corrected as shown below:

Col. 7, Table I, the headings for the last three columns should read:

| I. R | | |
|---|---|---|
| Cis-1,4 % | Trans-1,4 % | 1,2- % |

Col. 9, line 31, "benzoprene" should read --benzopyrene--

Signed and sealed this 4th day of July 1972.

(SEAL)
Attest:

EDWARD M. FLETCHER, JR.
Attesting Officer

ROBERT GOTTSCHALK
Commissioner of Patents